(12) United States Patent
Herwono et al.

(10) Patent No.: US 11,436,320 B2
(45) Date of Patent: Sep. 6, 2022

(54) ADAPTIVE COMPUTER SECURITY

(71) Applicant: BRITISH TELECOMMUNICATIONS PUBLIC LIMITED COMPANY, London (GB)

(72) Inventors: Ian Herwono, London (GB); Fadi El-Moussa, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 17/593,800

(22) PCT Filed: Mar. 18, 2020

(86) PCT No.: PCT/EP2020/057535
§ 371 (c)(1),
(2) Date: Sep. 24, 2021

(87) PCT Pub. No.: WO2020/193335
PCT Pub. Date: Oct. 1, 2020

(65) Prior Publication Data
US 2022/0092177 A1    Mar. 24, 2022

(30) Foreign Application Priority Data

Mar. 27, 2019    (EP) .................................... 19165663

(51) Int. Cl.
*G06F 21/55*    (2013.01)
*G06F 21/56*    (2013.01)
(52) U.S. Cl.
CPC .......... *G06F 21/552* (2013.01); *G06F 21/554* (2013.01); *G06F 21/562* (2013.01)

(58) Field of Classification Search
CPC ............. H04L 63/1416; H04L 63/1433; H04L 63/1425; G06F 21/566; G06F 21/552; G06F 21/554; G06F 21/562
See application file for complete search history.

(56) References Cited

U.S. PATENT DOCUMENTS 9,661,019 B2    5/2017   Liu
9,904,893 B2    2/2018   Veeramachaneni et al.
(Continued)

FOREIGN PATENT DOCUMENTS

CN    104539626 A    4/2015
CN    109829299 A    5/2019
(Continued)

OTHER PUBLICATIONS

Combined Search and Examination Report under Sections 17 and 18(3) for Great Britain Application No. GB1904277.9, dated Sep. 27, 2019, 7 pages.
(Continued)

*Primary Examiner* — Paul E Callahan
(74) *Attorney, Agent, or Firm* — Patterson Thuente IP

(57) ABSTRACT

A method of computer security for a host computer system in communication with remote computer systems, including generating an attack map as a directed graph data structure modelling individual events leading to an exploitation of the host computer system and collecting a log of each of a plurality of attack events occurring at the host including network packets involved in each attack event, the attack map being generated in a training phase of the host computer system in which the host is subjected to attacks by one or more attacking remote computer systems; using stacked autoencoders to extract features from the log event in each attack; generating a directed graph representation based on each of the extracted features; and responsive to an occurrence of a new attack in the host computer system, triggering (Continued)

the regeneration of the attack map including additional events generated in respect of the new attack.

5 Claims, 17 Drawing Sheets

(56) References Cited

U.S. PATENT DOCUMENTS

| | | |
|---|---|---|
| 9,906,551 B2 | 2/2018 | Ahmed et al. |
| 2014/0068769 A1 | 3/2014 | Neil |
| 2017/0032130 A1 | 2/2017 | Joseph Durairaj et al. |
| 2018/0048667 A1 | 2/2018 | Tang et al. |
| 2018/0176232 A1 | 6/2018 | Rodriguez et al. |
| 2019/0068620 A1 | 2/2019 | Avrahami et al. |
| 2020/0106795 A1 | 4/2020 | Servajean et al. |
| 2020/0210782 A1 | 7/2020 | Servajean et al. |

FOREIGN PATENT DOCUMENTS

| | | |
|---|---|---|
| EP | 3502943 A1 | 6/2019 |
| WO | WO-2015160367 A1 | 10/2015 |
| WO | WO-2018224670 A1 | 12/2018 |

OTHER PUBLICATIONS

Extended European Search Report for Application No. EP19165663.6, dated Sep. 10, 2019, 6 pages.
International Search Report and Written Opinion for Application No. PCT/EP2020/057535, dated May 20, 2020, 11 pages.
Jinwon A., et al., "Variational Autoencoder based Anomaly Detection using Reconstruction Probability," SNU Data Mining Center, Feb. 2015 Special Lecture on IE, Dec. 27, 2015, 18 pages.
Combined Search and Examination Report under Sections 17 and 18(3) for Great Britain Application No. GB1904275.3, dated Sep. 17, 2019, 7 pages.
Combined Search and Examination Report under Sections 17 and 18(3) for Great Britain Application No. GB1904276.1, dated Sep. 27, 2019, 6 pages.
Extended European Search Report for Application No. EP19165661.0, dated Sep. 10, 2019, 6 pages.
Extended European Search Report for Application No. EP19165662.8, dated Sep. 10, 2019, 6 pages.
Herrerias J., et al., "Log Analysis Towards an Automated Forensic Diagnosis System," International Conference on Availability, Reliability and Security, 2010, DOI 10.1109/ARES.2010.120, 6 pages.
International Preliminary Report on Patentability for Application No. PCT/EP2020/057532, dated Oct. 7, 2021, 8 pages.
International Preliminary Report on Patentability for Application No. PCT/EP2020/057533, dated Oct. 7, 2021, 8 pages.
International Preliminary Report on Patentability for Application No. PCT/EP2020/057535, dated Oct. 7, 2021, 8 pages.
International Search Report and Written Opinion for Application No. PCT/EP2020/057532, dated May 19, 2020, 11 pages.
International Search Report and Written Opinion for Application No. PCT/EP2020/057533, dated May 20, 2020, 11 pages.

FIGURE 7

| Node # | Feature | Node value |
|---|---|---|
| 1 | Source IP: 134.225.252.1 | 1 |
| 2 | Protocol: TCP | 1 |
| 3 | Source IP: 112.1.254.22 | 0 |
| 4 | Destination IP: 10.112.52.1 | 0 |
| 5 | Protocol: ICMP | 1 |
| . | . | . |
| . | . | . |
| . | . | . |
| 20,000 | Source IP: 182.22.5.1 | 0 |

FIGURE 8

| Node # | Feature (i.e. payload detection rule) | Node value (i.e. rule matched) |
|---|---|---|
| 1 | Detection rule #1 | 1 |
| 2 | Detection rule #2 | 1 |
| 3 | Detection rule #3 | 0 |
| 4 | Detection rule #4 | 0 |
| 5 | Detection rule #5 | 1 |

FIGURE 9

| Node # | Feature | Node value |
|---|---|---|
| 1 | Packet attribute value #1 | 1 |
| 2 | Packet attribute value #2 | 0 |
| 3 | Packet attribute value #3 | 0 |
| 4 | Packet attribute value #4 | 0 |
| 5 | Packet attribute value #5 | 1 |
| . | . | . |
| . | . | . |
| . | . | . |
| 19,500 | Packet attribute value #19500 | 0 |
| 19,501 | Payload detection rule #1 | 0 |
| 19,502 | Payload detection rule #2 | 1 |
| . | . | . |
| . | . | . |
| . | . | . |
| 20,000 | Payload detection rule #500 | 1 |

20,000 sized bit string

FIGURE 12

|         | Port Scanning | Web Crawling | Banner Grabbing | Brute Force | C&C Traffic |
|---------|---------------|--------------|-----------------|-------------|-------------|
| Event 1 | 1             | 0            | 0               | 0           | 0           |
| Event 2 | 0             | 0            | 1               | 0           | 0           |
| Event 3 | 0             | 1            | 0               | 0           | 0           |
| Event 4 | 0             | 0            | 0               | 1           | 0           |
| Event 5 | 0             | 0            | 0               | 0           | 1           |

←—— Features set {A} ——→

FIGURE 13

Event 3 ↓          Event 4 ↓   Event 5 ↓

|         | Port Scanning | Web Crawling | Banner Grabbing | Brute Force | C&C Traffic |
|---------|---------------|--------------|-----------------|-------------|-------------|
| Event 2 | 0             | 1            | 0               | 0           | 0           |
| Event 3 | 0             | 0            | 0               | 1           | 1           |

←—— Features set {B} ——→

|         | HTTP Port 80 open | SSL Port 443 open | DNS allowed | Windows 2008 | Windows 2012 | ... |
|---------|-------------------|-------------------|-------------|--------------|--------------|-----|
| Event 1 | 1 | 1 | 1 | 0 | 1 | |
| Event 2 | 1 | 1 | 1 | 0 | 1 | |

Features set {C}

ADAPTIVE COMPUTER SECURITY

PRIORITY CLAIM

The present application is a National Phase entry of PCT Application No. PCT/EP2020/057535, filed Mar. 18, 2020, which claims priority from EP Patent Application No. 19165663.6, filed Mar. 27, 2019, each of which is hereby fully incorporated herein by reference.

TECHNICAL FIELD

The present disclosure relates to computer security. In particular it relates to generating a directed graph of events involved in cyber-attacks.

BACKGROUND

Cyber-attacks on network connected computer systems increase in sophistication and their detection becomes more difficult. Detection tools are prone both to false positives and to failure to detect new and/or evasive attacks. Furthermore, alerts issued by such tools can relate to isolated episodes localized in time and space leaving a cyber-defense analyst to join up individual occurrences to work out a bigger picture. Meanwhile, considerable valuable information lies latent in disconnected silos of low-level data.

Thus, there is a challenge in overcoming the aforementioned issues.

SUMMARY

According to a first aspect of the present disclosure, there is a provided a computer implemented method of computer security for a host computer system in communication with remote computer systems, the method comprising: generating an attack map as a directed graph data structure modelling individual events leading to an exploitation of the host computer system, the attack map being generated in a training phase of the host computer system in which the host is subjected to attacks by one or more attacking remote computer systems, and generating the attack map includes collecting a log of each of a plurality of attack events occurring at the host including network packets involved in each attack event; using stacked autoencoders to extract features from the log event in each attack; generating a directed graph representation based on each of the extracted features based on a temporal relationship between events for each extracted feature and a predefined definition of each of a plurality of attack patterns defining events and temporal relationships between events, responsive to an occurrence of a new attack in the host computer system, the attack not resulting in the generation of attack events constituting a path through the attack map to a known exploitation, triggering the regeneration of the attack map by the above steps including additionally events generated in respect of the new attack.

In some embodiments, the extracted features for each attack are combined with static features of each attack.

In some embodiments, before generating the directed graph, all extracted features are clustered using a clustering algorithm to generate clusters of related extracted features.

According to a second aspect of the present disclosure, there is a provided a computer system including a processor and memory storing computer program code for performing the method set out above.

According to a third aspect of the present disclosure, there is a provided a computer system including a processor and memory storing computer program code for performing the method set out above.

BRIEF DESCRIPTION OF DRAWINGS

Embodiments of the present disclosure will now be described, by way of example only, with reference to the accompanying drawings, in which:

FIG. 7 depicts a feature mapping for an input vector of an autoencoder in accordance with an exemplary embodiment of the present disclosure.

FIG. 8 shows an example mapping of packet payload features in accordance with an exemplary embodiment of the present disclosure.

FIG. 9 shows a structure of an input feature vector for an event log set in accordance with an exemplary embodiment of the present disclosure.

FIG. 12 illustrates an event classification feature set in accordance with an exemplary embodiment of the present disclosure.

FIG. 13 illustrates a successive events feature set in accordance with an exemplary embodiment of the present disclosure.

DETAILED DESCRIPTION

Figure 1:
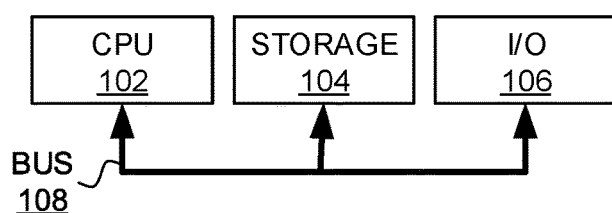
FIG. 1 is a block diagram a computer system suitable for the operation of embodiments of the present disclosure.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random-access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
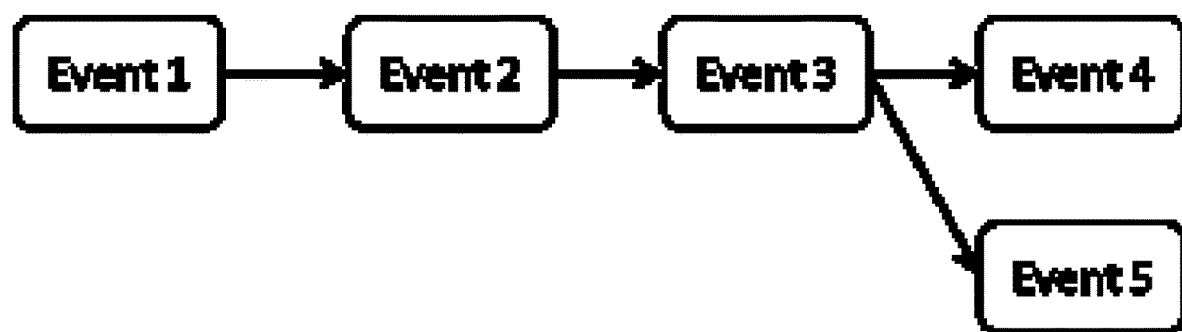
FIG. 2 depicts an exemplary attack pattern.

Embodiments of the present disclosure seek to identify causal relationships between steps or stages in a cyber-attack and identify resources and exploitation mechanisms utilized by an attacker. An attack pattern is represented as a directed graph or a sequence of events, as shown in FIG. 2. Mostly the graph is acyclic, but there might be some cases where a cyclic directed graph structure may describe an attack pattern. Each event in the attack pattern is observable from network activities, e.g. through network packet capture. Embodiments of the present invention thus provide a cyber-defense system that employs attack patterns for detecting potential cyber-attacks having initial attack patterns created and defined by security experts or experienced analysts. The attack patter specifies indicators and parameters such as alert signature name, packet frequency, protocol type, packet sizes, time window, etc., in order to detect or identify particular event that could be part of an attack pattern. For example, to identify an event "Port Scanning", an analyst may specify a packet frequency of over 100 packets within one minute.

Furthermore, FIG. 2 also shows that an attack pattern may have branches where an event (e.g. Event 3) may be followed by more than one type of events (e.g. Event 4 and Event 5), each creating different paths on how the attack may progress. Different attack paths may lead to different types of security breach, e.g. Event 4 may lead to data exfiltration while Event 5 may lead to denial of service.

Since the attack patterns are specified based on knowledge and experience of a group of security analysts, such pattern/rule-based cyber-defense system is prone to the following issues:

Incomplete patterns: The security analyst, who defines an attack pattern based on their own knowledge and experience, may have missed or not known one or more events that could also be used to detect particular stage of an attack.

Inaccurate patterns: An analyst may not have enough low-level knowledge of packet capture logs for identifying events through deep packet inspection method. The measures and parameters defined by the analyst may thus not be accurate.

Sequence variation: The sequence of events indicating certain type of attack may not always be (exactly) the same as defined in the attack pattern. It relies on the analysts being able to specify all possible sequences of events for that particular type of attack. If the analysts missed such possible sequence and due to the fact that the attack patterns are independent from each other, this may eventually lead to attacks being overlooked by the system.

Thresholds variation: The analysts may have used certain threshold values to identify particular events. However the analysts may have set a wrong threshold value or the threshold may need to be changed or updated over time. This condition may lead to non-detection of the attack.

Missing data: The analyst may have specified the type of log data and parameters that can be used for detecting particular event. However there may be some cases where the required data is not available or missing from the logs, which prevents the event to be detected. Consequently the system may also miss any of the successive events (depending on the pattern structure).

Network configuration variation: Different networks will have different configurations in terms of infrastructure and security configurations, such as different types of security sensors, firewall rules, etc. An attack pattern that was defined for specific network configuration may not be effective for detecting the same type of attack on a network with different configuration.

Pattern diversity: Different analysts will have had different experience and expertise when it comes to spotting particular type of attack. Hence it is possible that they may create slightly or completely different patterns to detect the same type of attack. This is probably a good thing to have in the system in order to cope with attack variation, but every pattern created by each analyst may still be prone to one or more of the other issues mentioned before (e.g. incomplete patterns, sequence variation, etc.).

Embodiments of the present disclosure addresses the issues faced by rule- and pattern-based cyber-defense systems and improves their performance (in terms of, for example, attack detection and prediction) by collecting event information from each of a plurality of attack patterns, gathering intelligence from network traffic patterns in logs data through application of deep learning method, combining them with network configurations and attack pattern repository along with correlation rules to create attack maps that show all possible attack paths.

A method is provided for building an automated Attack Map Generation System (AMGS) with the following characteristics:

The system constructs attack maps containing all possible attack paths;

The system learns and finds missing paths an attacker could follow from the created attack map to detect future more complex attacks;

The system can identifies a state of an attack in an attack map (e.g. define a location of an attack in an attack map) after correlating and interconnecting existing attack patterns; and The system predicts attack likelihood, e.g. probability of attack to happen.

Figure 3:
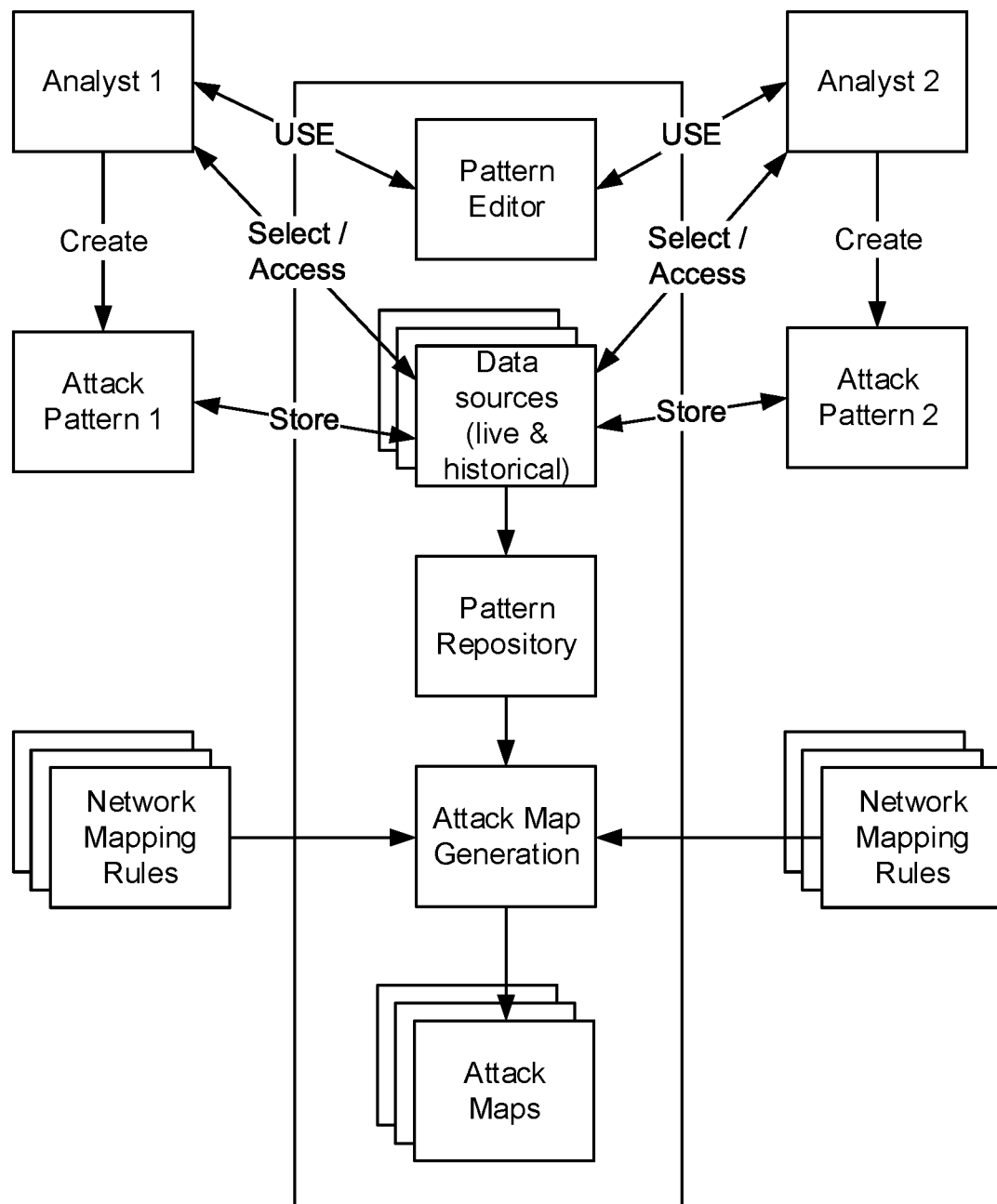
FIG. 3 illustrates an exemplary architecture of a cyber-defence system in accordance with embodiments of the present disclosure.

The AMGS can be integrated with a cyber-defense analytics system that makes use of rules or attack patterns for detecting potential cyber-attacks. FIG. 3 illustrates an exemplary architecture of a cyber-defense system in accordance with embodiments of the present invention. Each analyst uses a "pattern editor" to create and define an attack pattern as sequence of events (such as the pattern illustrated in FIG. 2). Analysts select data sources that contain relevant network and traffic logs for detecting events. Attack patterns are stored in a pattern repository or database. In order to create attack maps the AMGS takes details of existing attack patterns, associated event logs, and network mapping information as its inputs.

Attack maps are directed graphs of attack event and are constructed by interconnecting or merging two or more attack patterns based on a similarity of events contained therein. A suitable method can operate based on, for example, the following assumptions:

- Different user analysts (of same or different administrative domain) may create similar attack patterns independently or that certain section of their patterns may be similar;
- The different (independent) attack patterns may complement each other to improve their detection accuracy. For example, to detect Event 1 as part of Attack Pattern 1 a data source DS1 is chosen by an analyst; at the same time another analyst may chose a different data source DS2 to observe the same Event 1 as part of Attack Pattern 2. Hence, by merging the two attack patterns, Event 1 can either be observed from data source DS1 or DS2, improving its flexibility in terms of required data as now both attack paths (represented by both attack patterns) can be used to monitor how the attack will progress;
- Over time—as more and more event data is collected—it may become more visible which patterns or attack paths are more accurate than the others.

Figure 4:
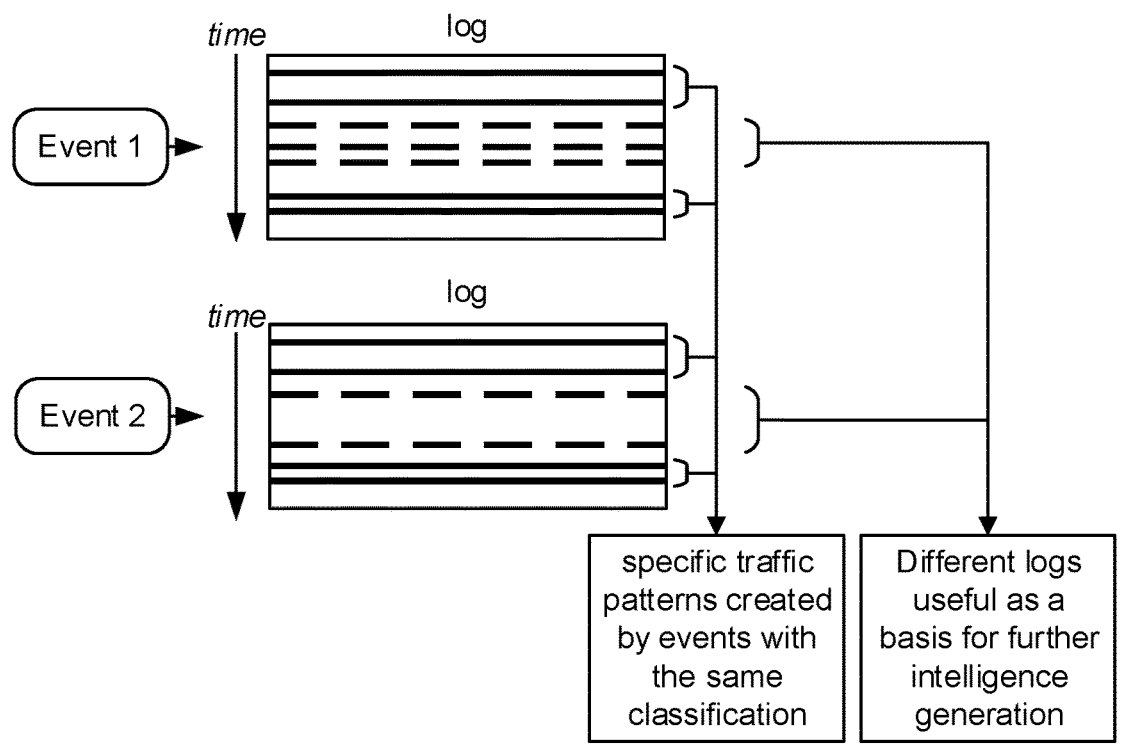
FIG. 4 depicts two events with an identical classification having traffic logs with similarities and differences according to an exemplary embodiment of the present disclosure.

Prior to interconnecting attack patterns some information about detected events is collected. Each event is a node in a graph structure of an attack pattern. The information is summarized as follows and includes, inter alia, for example:

1. Event classification: This is a classification that an analyst assigns to each event of an attack pattern. The classification indicates a type of activity or threat that should be detected to represent the event. Examples of classification names are "Port Scanning", "Banner Grabbing", "Denial of Service", etc. There may be various ways to detect events of the same classification depending on analyst's knowledge, logs availability and network configuration. For example, to detect port scanning activity one analyst may configure the system to examine the received ARP (Address Resolution Protocol) broadcast messages, while another analyst may want to analyze specific TCP (Transmission Control Protocol) packets, e.g. TCP SYN/ACK packets. Embodiments of the present use a list of classification names (as may be provided by the pattern editor of the cyber-defense software system). Methods for populating the classification list will be apparent to those skilled in the art.
2. Classification of successive events: Whenever detail of an event is extracted, a classification name of its successive event is also recorded. There may be zero, one or more successive events for any particular event in a pattern. In the example shown in FIG. 2, Event 2 is the successive event of Event 1, and Event 3 is the successive event of Event 2, and finally Event 4 and Event 5 are both the successive events of Event 3.
3. Network mapping: This contains information about current network settings and configurations, security filter rules, and network connectivity at a time when an event was observed. For example, "HTTP port 80 is open", "Operating system is Windows 2012", "DNS is allowed", etc.
4. Information extracted from intelligence gathering: An intelligence gathering process looks at extracting information from logs collected for each detected event, e.g. packets capture logs. It seeks to identify similarities or differences between log sets of events with the same or a different classification. As shown in FIG. 4, two events with an identical classification (event 1 and event 2) may share some similarities in their logs but their logs may also contain other traffic patterns that are not directly associated with the event classification. Such traffic patterns could be used to create intelligence as an attacker may try to do something additional or different. Embodiments of the present invention apply deep learning techniques to extract information from the logs.

Figure 5:
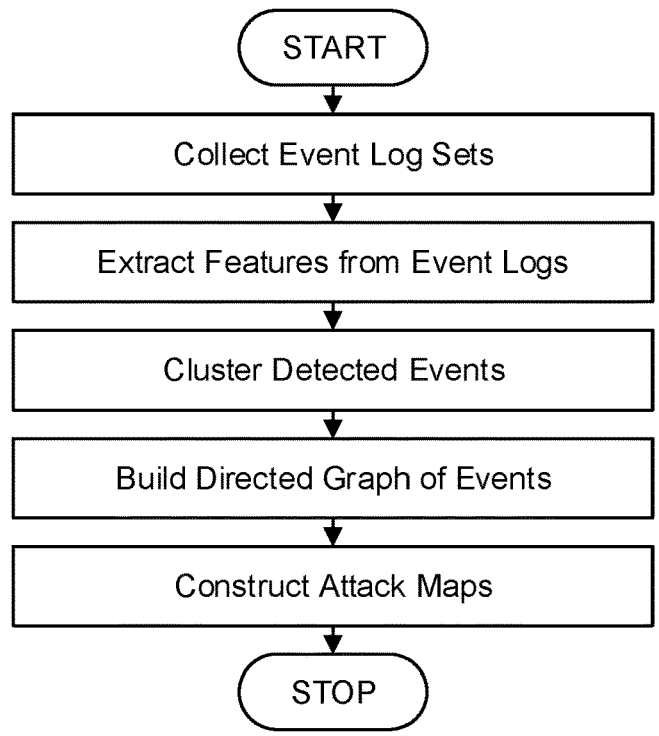
FIG. 5 is a flowchart of a method for attack map generation according to embodiments of the present disclosure.

FIG. 5 shows the steps to be implemented by the AMGS (Attack Map Generation System) to generate attack maps, i.e.:

1. Collect event log sets;
2. Extract features from event logs;
3. Cluster the detected events;
4. Build directed graphs of events; and
5. Construct attack maps.

Collect Event Log Sets

Network logs which contain details of captured network packets are collected by a cyber-defense system whenever the network traffic matched the traffic patterns specific to an event. The logs may contain more network packets than necessary to match the specified traffic patterns. For example, if one particular external IP address had been identified as potential source for a port scanning event, all network packets originating from that IP address are included in the logs for the duration of the port scanning. These additional network packets will later be examined during intelligence gathering process.

Figure 6:
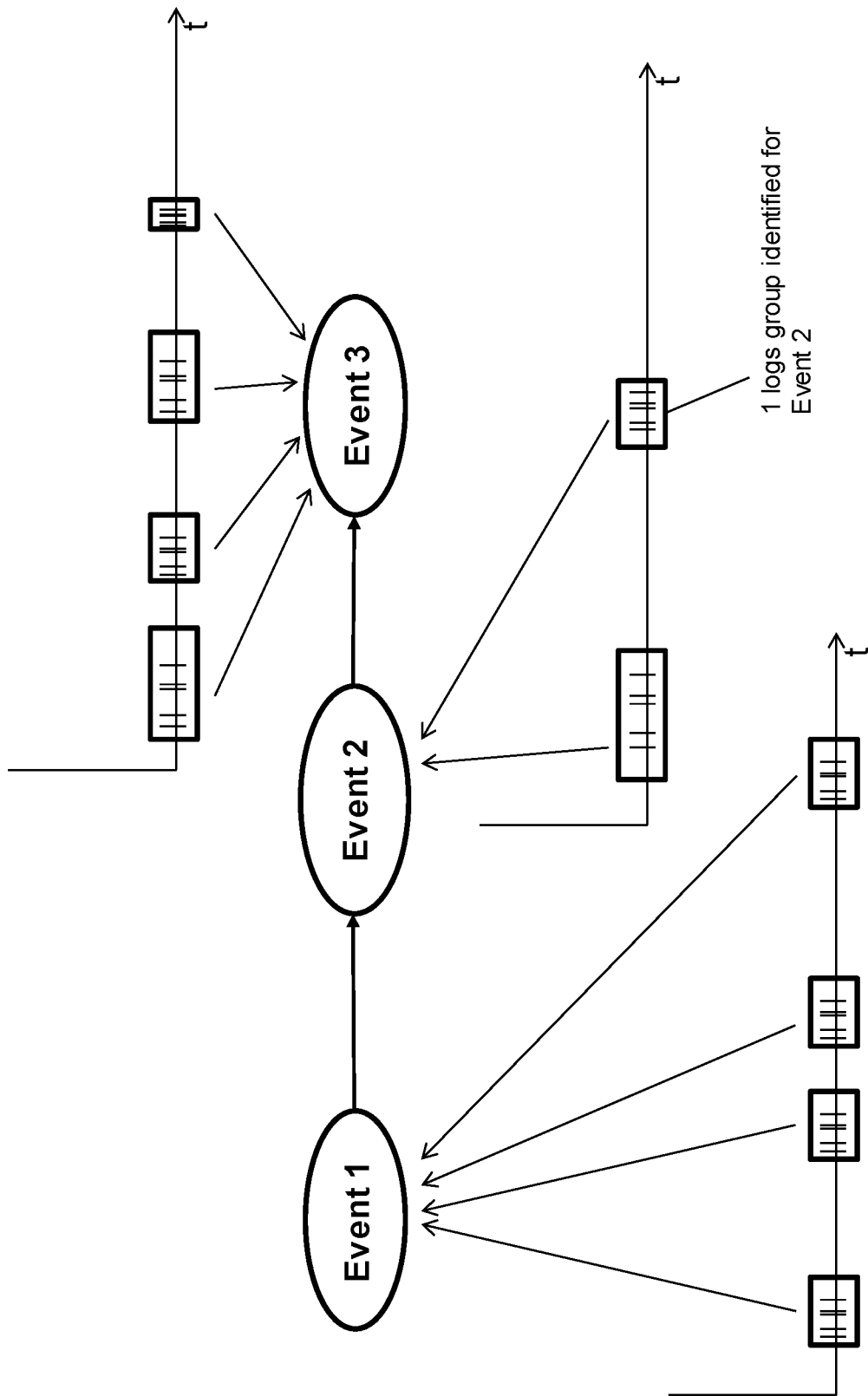
FIG. 6 depicts a scenario of log sets recorded for events in an exemplary embodiment.

An event log set consists of a series of network packets that were captured and recorded by the system when the associated event was detected. The packets are normally sorted in chronological order. FIG. 6 depicts a scenario of log sets recorded for events in an exemplary embodiment. As illustrated in FIG. 6, four log sets recorded for Event 1, two log sets for Event 2 and four log sets for Event 3. The log sets are collected continuously over time. Although the three events (Event 1, Event 2, and Event 3) are specified as a sequence of events for a potential security breach, their logs are collected independently from each other.

Extract Features from Event Logs

Each event log set consists of information about the captured network packets such as source and destination IP address, port numbers, protocol type, along with the packet payload. All of this information can be considered as the features of the log set. Since the aggregated packet data will be high-dimensional and some of the information may be redundant, it needs to be reduced to a much smaller code representing the important features. Those features can later be used to distinguish the event from other types of event or to group it with other similar events. Deep learning techniques can be used to learn those features and build the optimal feature vector for the given data which can later be inputted to standard machine learning algorithm for further processing, e.g. clustering, classification, etc.

Deep learning is a branch of machine learning which focuses on learning meaningful representations of data. Various deep learning architectures such as deep belief networks, convolutional neural networks, and stacked autoencoders have been applied to fields such as computer vision, automatic speech recognition or natural language processing. Exemplary embodiments of the present disclosure employ stacked autoencoders. An autoencoder is a simple (e.g. 3-layer) artificial neural network composed of, for example, an input layer, a hidden layer and an output layer. Typically, a number of hidden units (or neurons/nodes) is less than a number of visible (input or output) units. As a result, when data is passed through such a network, it first compresses (encodes) an input vector to "fit" in a smaller representation, and then seeks to reconstruct (decode) it back. For each input x, it is first mapped to a hidden layer y, and an output layer tries to reconstruct x. Training a network seeks to minimize a reconstruction error, i.e. to find a most efficient compact representation (encoding) for input data. Autoencoders are typically trained using backpropagation with stochastic gradient descent.

A stacked autoencoder is a neural network consisting of multiple layers of sparse autoencoders in which the outputs of each layer are connected to the inputs of a successive layer. Unsupervised pre-training of a network can be undertaken one layer at a time. Once a first k layers are trained, it is possible to train the (k+1)-th layer using an internal representation (i.e. feature vector) of the k-th layer. The size of feature vector is gradually reduced at each layer. For example, stacked autoencoders can be networked with five layers that compress a number of features from, e.g. 20,000 to 250. During a training phase denoising autoencoders may optionally be used instead of basic autoencoders. A denoising autoencoder adds a stochastic corruption step operating on the input. The idea is to force autoencoders to not learn an identity function, but more robust features, by reconstructing the input from a corrupted version of it. This way an autoencoder needs to capture the statistical dependencies between the inputs in order to reconstruct a distorted input.

In order to use stacked autoencoders for extracting important features from event logs, all the information collected for each event log set needs to be converted to fixed-size input feature vector. An autoencoder according to embodiments of the present disclosure takes an input $x \in [0,1]^d$ and maps it (with an encoder) to a hidden representation $y \in [0,1]^{d'}$. In an exemplary embodiment, a binary value is assigned to each input node in order to indicate whether or not particular information or feature, e.g. a source IP address, a port number, etc., is contained in the event log set (i.e. at least one network packet has the feature). FIG. 7 shows an example of such features mapping for an input vector with 20,000 nodes.

An entire (binary) input feature vector provides an uncompressed representation for an event log set. A size of the input vector depends on the (training) datasets and should be large enough in order to sufficiently represent a variety of possible feature values contained in different event log sets. A method to select the features and determine their orders is described in the following.

For each network packet contained in an event log set the following information is extracted:
Packet attributes:
Source IP address
Destination IP address
Source port number
Destination port number
Protocol type
Packet payload A key/value pair is then created for each packet attribute, i.e. Source IP: "133.142.1.25", Destination port: 80, etc. All (unique) key/value pairs for all packets contained in an event log set are collated into a global list $L_{pa}$. This global list contains unique key/value pairs extracted from all observed events (i.e. different log sets) available in the training data.

The packet payload is matched against a global list of all payload detection rules $L_{pdr}$ that the cyber-defense system may be using to detect various cyber events. A regular expression is an example for such detection rules, e.g. rules for detecting SQL injection: "/\w*((\% 27)|(\'))((\% 6F)|o|(\% 4F))((\%72)|r|(\% 52))/ix". Each detection rule is represented by a node in the input layer and assigned a binary value "1" if there is at least one packet contained in the event log set matching the rule; otherwise it is "0". FIG. 8 shows an example mapping of the packet payload features.

A number of input nodes resulting from the list $L_{pdr}$ may not need to be reduced since it is often manageable. However, a size of the list $L_{pa}$ can be very large and may need to be reduced. Provided that 20,000 nodes are enough to represent an input layer for each event log set, if $L_{pdr}$ is 500 long then a number of input nodes representing the packet attribute values need to be reduced to 19,500. The following steps describe how to do this:
1. Compare the packet attributes (i.e. key/value pairs) contained in each event log set with the global list $L_{pa}$;
2. Remove the packet attributes which appear in every event log set from $L_{pa}$ (since they contain no information);
3. For each packet attribute in $L_{pa}$ count the number of event log sets in which it appears; and
4. Select the top 19,500 packet attributes with highest frequency.

Figure 10:
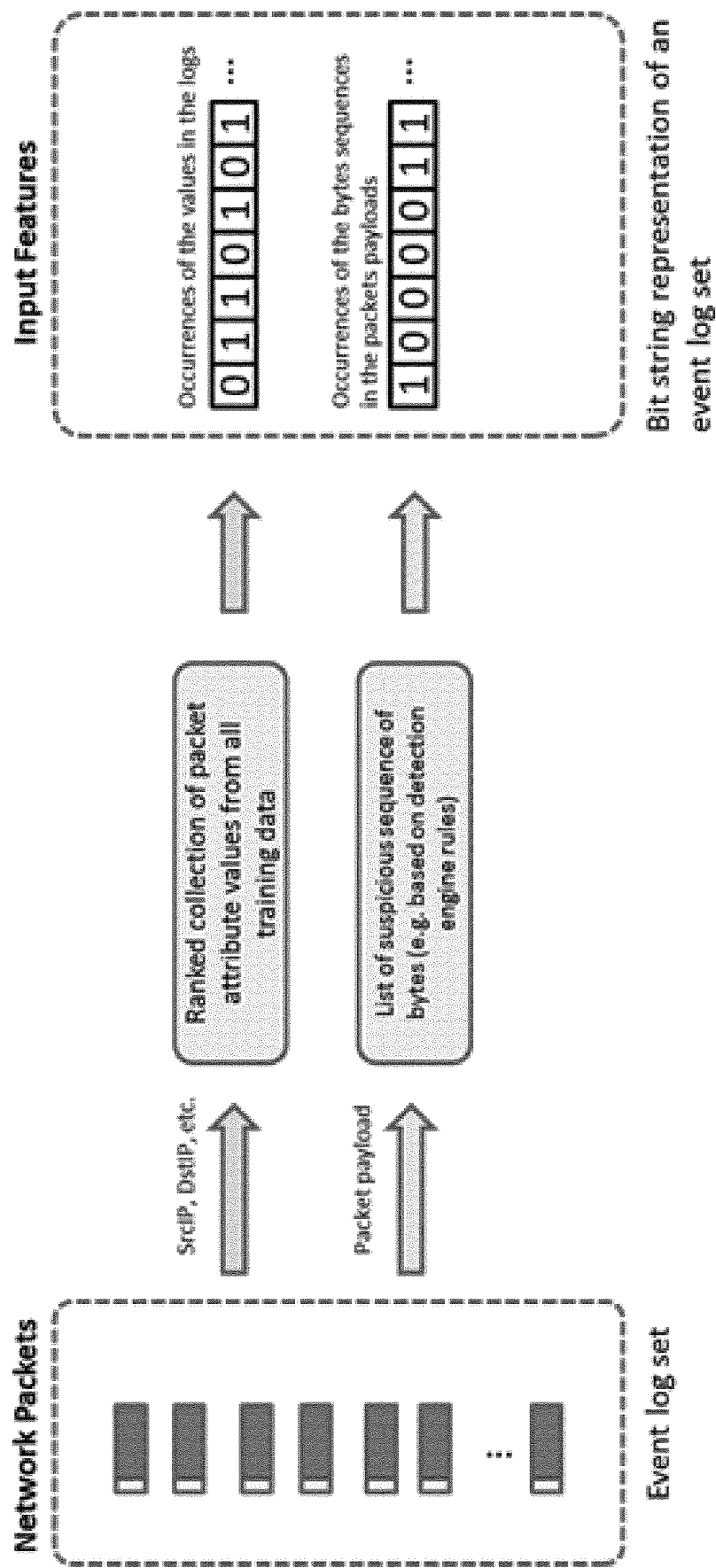
FIG. 10 summarizes a process for converting an event log set into a bit string representation in accordance with an exemplary embodiment of the present disclosure.

The occurrence of each packet attribute value in at least one packet contained in an event log set determines whether the input node is assigned a binary value "1" or "0". By combining both input nodes for packet attributes and payload detection rules, every event log set can thus be represented as a 20,000 sized bit string. FIG. 9 shows the structure of input feature vector for an event log set. FIG. 10 summarizes a process for converting an event log set into its bit string representation.

Figure 11:
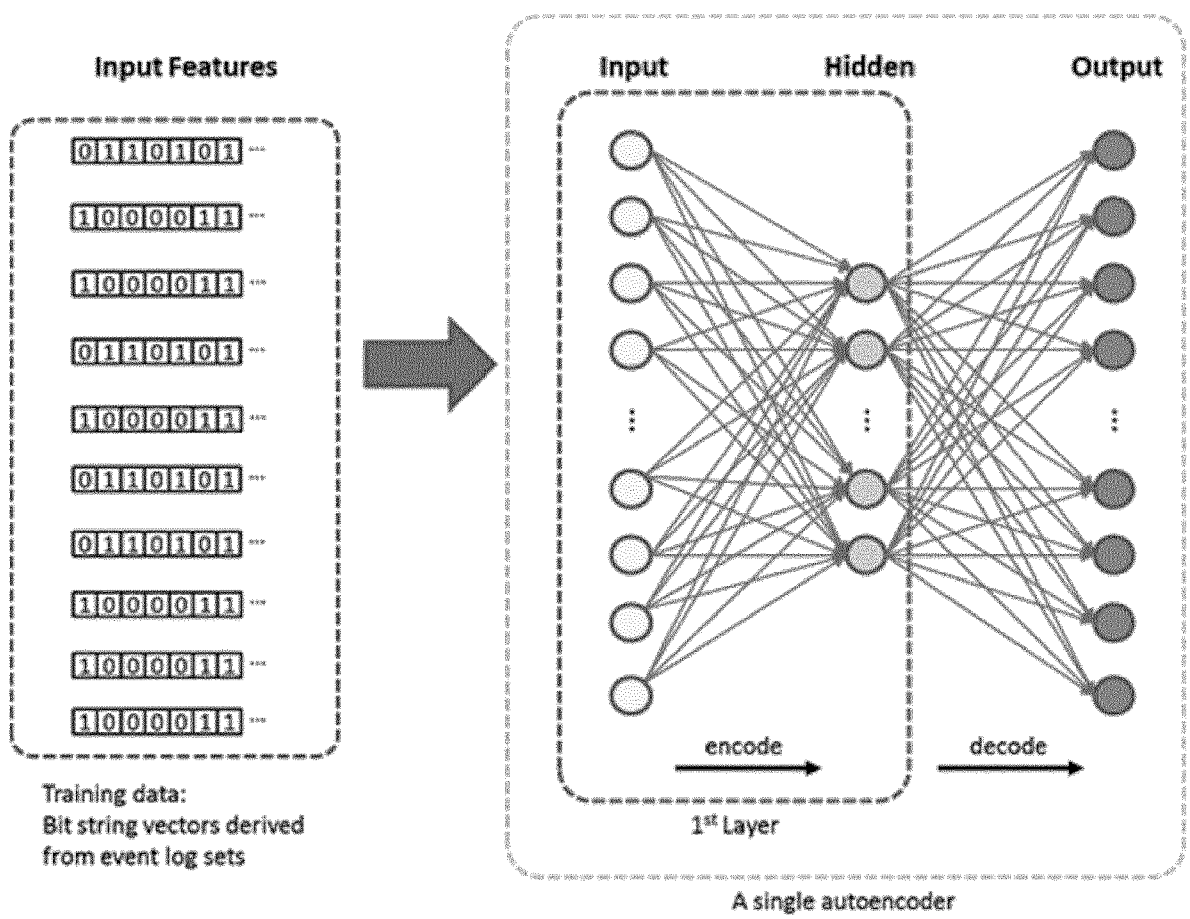
FIG. 11 illustrates training of a single layer of autoencoder with the input vectors from all training data in accordance with an exemplary embodiment of the present disclosure.

The input features of all training data are then used to train the stacked autoencoders one layer at a time. FIG. 11 illustrates the principle of training a single layer of autoencoder with the input vectors from all training data; when an autoencoder's training is complete, the decoder layer can be discarded, the values of the encoder layer (i.e. weights) fixed and the output of the hidden layer passed as the input to a new autoencoder, which can be trained similarly. A goal is to significantly reduce the number of features through multiple layers of autoencoders in order to extract the important features of an event log set. As described earlier, stacked autoencoders with five layers may be used to reduce a number of features from 20,000 to 250. While the input nodes are represented by binary values, the resulting hidden nodes at each layer (and thus the output nodes) will have decimal values ranging between 0 and 1. Once the entire stacked autoencoders network has been trained (i.e. the weights at each layer are frozen), the network can be used to extract important features from any (new) event log set, i.e. compressing its feature vector size from 20,000 to 250. These features are the dynamic features of a detected event and used as input features for clustering the log sets.

Cluster the Detected Events

This step aims to group together detected events that share similar characteristics by means of a clustering algorithm. Each time a cyber-defense system detects a new event, its relevant network logs are collected into an event log set from which a set of input features is derived (using the method summarized in FIG. 10). This input features set {X} is passed to a trained stack of autoencoders to extract its representative features set {Y}, represented by an output feature vector containing decimal values ranging between 0 and 1.

Figures 14, 16:
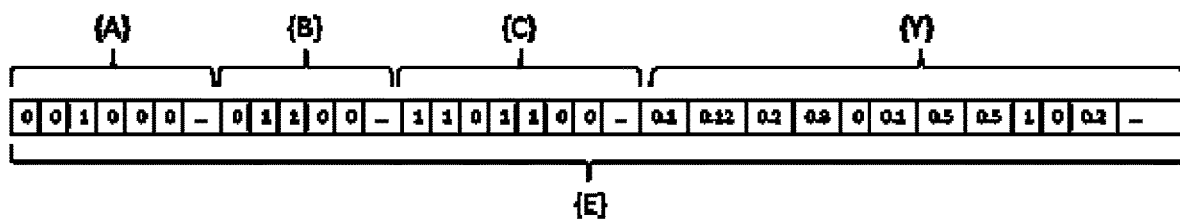
FIG. 14 illustrates a network mapping feature set in accordance with an exemplary embodiment of the present disclosure.
FIG. 16 illustrates an aggregation of feature sets in accordance with an embodiment of the present disclosure.

Additionally the following sets of static features are populated for the detected event:

1. Event classification features set {A}: This set contains the list of all types of activity or threat that an analyst can choose from to classify the event (during the event definition phase). Only one type of activity is assigned to an event. The features set {A} contains binary values indicating the classification of the event. FIG. 12 shows how the features set {A} is populated for different events, e.g. Event 1 is classified as "Port Scanning", Event 2 as "Banner Grabbing", etc.
2. Successive events features set {B}: This set also contains the list of all types of activity or threat that can be assigned to an event. However, the classification now refers to the successive events. For example, if there is an attack pattern where Event 3 is followed by Event 4 and Event 5 (cf. FIG. 2) the features set {B} for Event 3 will indicate the classification of Event 4 and Event 5. FIG. 13 shows such features set {B} whereas Event 4 is classified as "Brute Force" and Event 5 as "C&C Traffic". All values will be zero if no successive event was defined.
3. Network mapping features set {C}: This set contains a list of pre-defined network settings and configurations, security filter rules, and network connectivity, e.g. "HTTP port 80 is open", "Operating system is Windows 2012", "DNS service is allowed", etc. The binary features values indicate which of those settings and configurations were set up that way (i.e. "true") when the event was detected (FIG. 14). Hence it is normal that the features sets {C} of many different events will be identical if no changes have been made on its network configurations between the points of detection.

Figure 15:
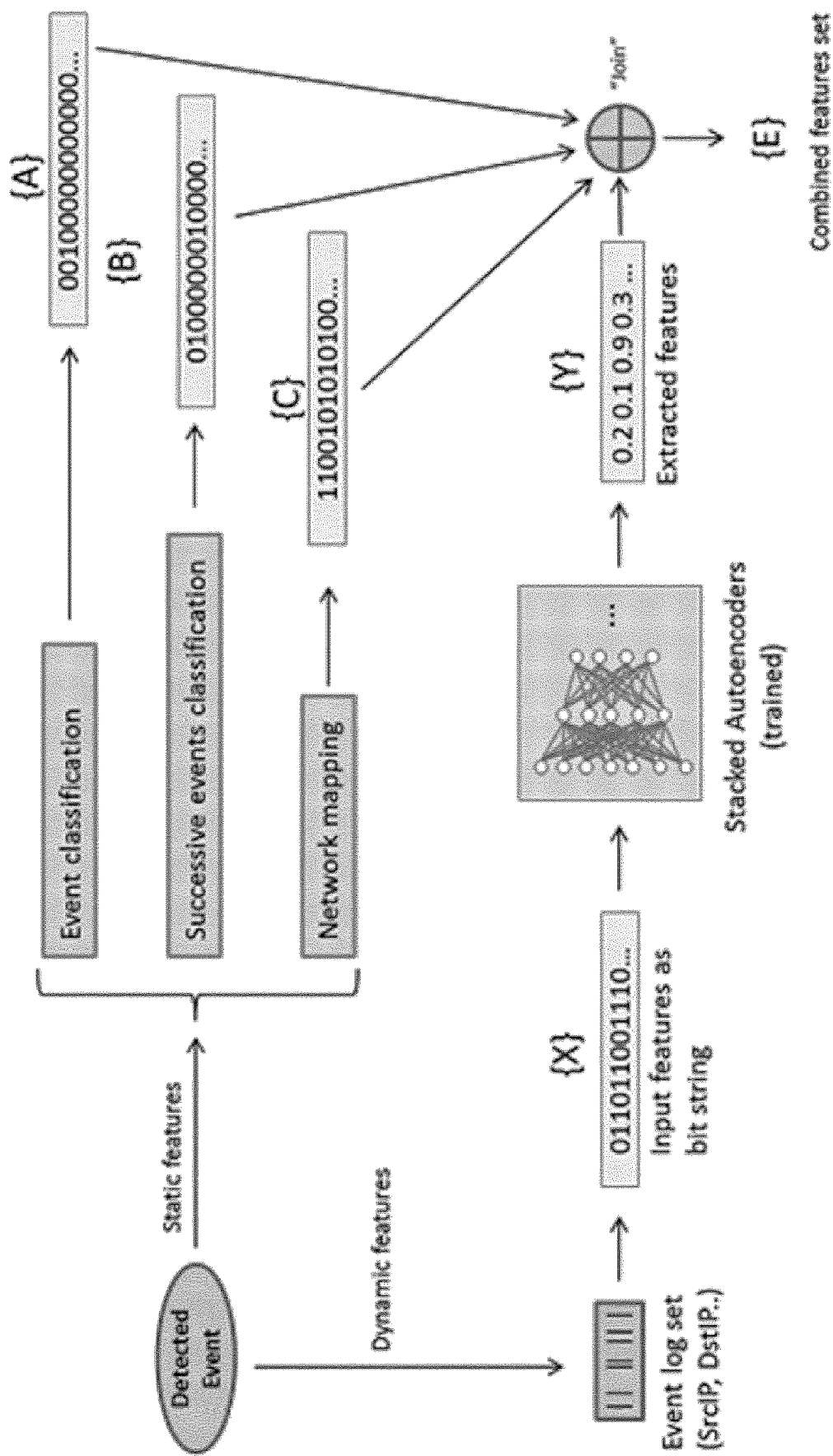
FIG. 15 illustrates the process of generating and joining feature sets in accordance with an embodiment of the present disclosure.

As summarized in FIGS. 15 and 16, all the input features sets {A}, {B}, {C} and {Y} are joined together to represent the detected event. The resulting features set {E} consists of a mixture of binary and decimal values (FIG. 16). This features set will later be inputted into a clustering algorithm.

Figure 17:
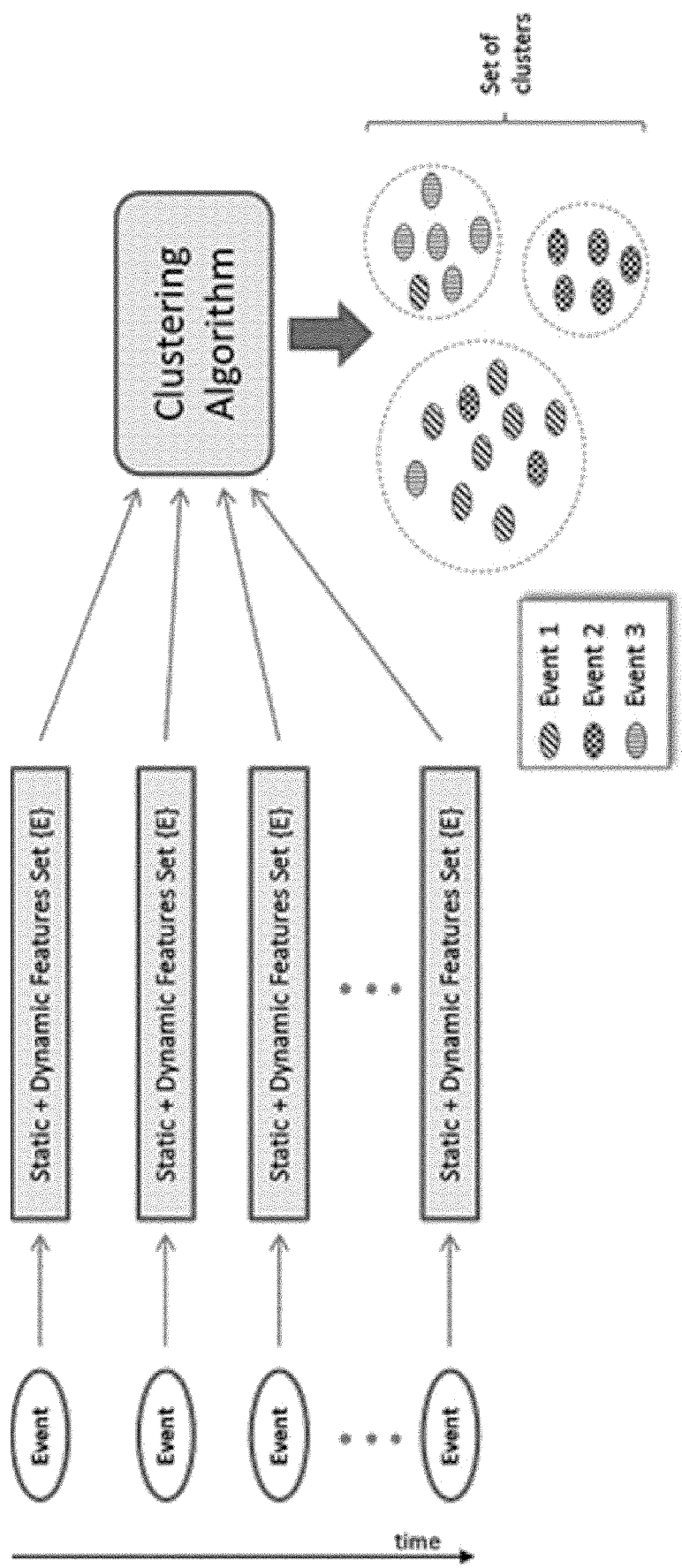
FIG. 17 depicts a process for generating a set of clusters of events in accordance with an exemplary embodiment of the present disclosure.

In the next stage the combined features sets {E} from all detected events (past and new) are passed to an unsupervised clustering algorithm. Clustering is the task of grouping particular set of objects (i.e. events) based on their characteristics, and aggregating them according to their similarities. Embodiments of the present disclosure use a continuous clustering process as more and more new events get detected over time. A moving time window (e.g. 7 days or 1 month) within which the events were detected can be introduced to improve system performance and avoid scalability issues. At the end of each clustering cycle a set of clusters of events is produced, as depicted in FIG. 17. An event can only belong to one cluster. The figure also shows that events of different names (and classifications) may be grouped into the same cluster due to the fact that their dynamic features (derived from log sets) may share some similarities.

A number of clustering algorithms exist for use in embodiments of the present disclosure. One example is the k-means algorithm which is well known by those skilled in the art for its efficiency in clustering large data sets. The algorithm fixes a number of clusters to k, where each cluster is represented by a central vector, which may not necessarily be a member of the dataset. The so-called elbow method can be used to determine an optimal number of clusters k. Other methods such as silhouette scores computation may also be used; it very much depends on the dataset which method to choose, e.g. if the data is not very clustered the elbow method may not perform well.

Since the standard k-means algorithm works on numeric values and the combined features set {E} presented here consists of a mixture of numeric ({Y}) and categorical/binary values ({A}, {B}, {C}), an extended k-means algorithm can be employed instead. An extension called k-prototypes algorithm exists in the literature to allow for clustering objects described by mixed numeric and categorical attributes. It defines a combined dissimilarity measure between two mixed-type objects X and Y where squared Euclidean distance measure is used on their numeric attributes and simple matching dissimilarity measure is used on their categorical/binary attributes. Simple matching dissimilarity measure means that the smaller the number of mismatches between the two objects (with categorical values) is, the more similar the two objects.

Build Directed Graphs of Events

Figure 18:
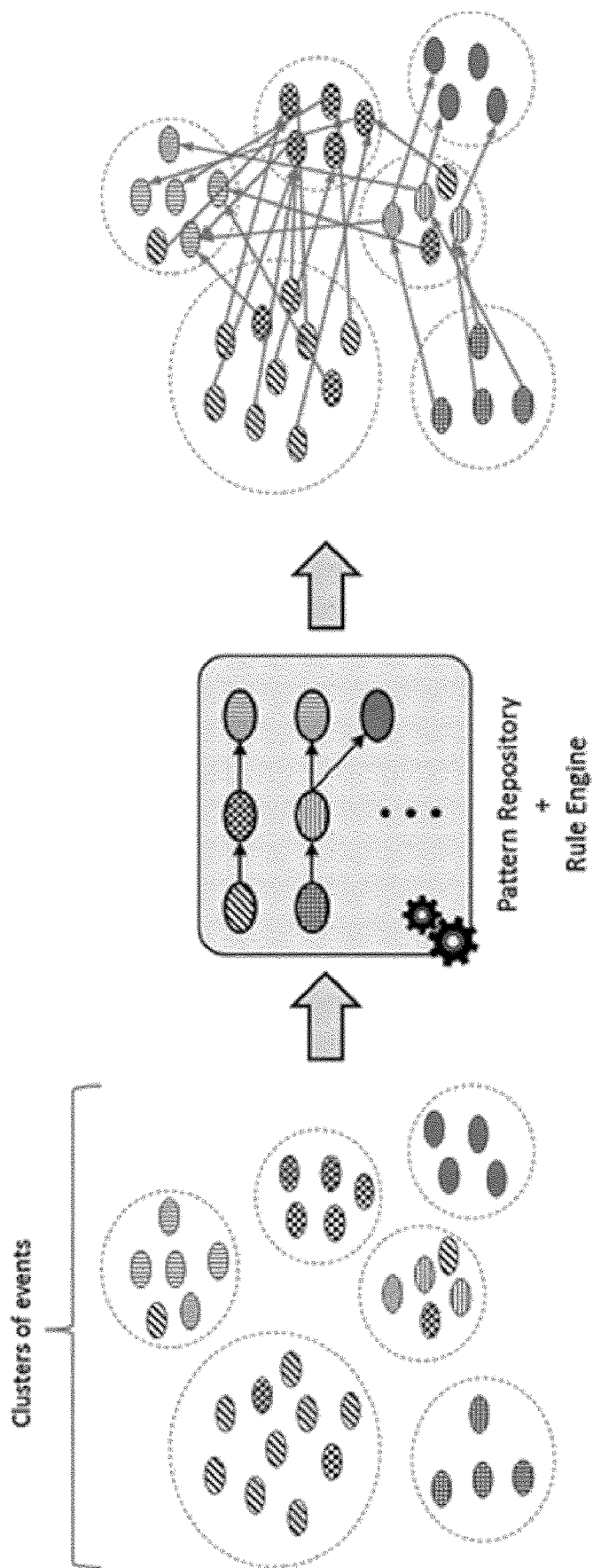
FIG. 18 illustrates a process of building an event graph in accordance with embodiments of the present disclosure.

The events that have been grouped into multiple clusters are then connected with each other to reconstruct a sequence defined in the relevant attack patterns stored in the pattern repository. Each event was detected as part of at least one attack pattern. Furthermore, it is assumed that a (rule) engine of the cyber-defense system is capable to join the events together that belong to the same attack pattern; for example, this could be done by linking the same destination IP address or other attributes that has been identified in two successive events within particular time frame. By using all of this information multiple (independent) directed graphs (mostly acyclic) can be built to describe the relationships between the events, e.g. Event a is followed by Event b, Event b is followed by Event c, and so forth. FIG. 18 illustrates the process of building such graphs whereas Event 1, Event 2, . . . Event 6 denote the names of detected events. Although multiple events may share the same name each of them is unique since they were detected at different times and will have different log sets.

Figure 19:
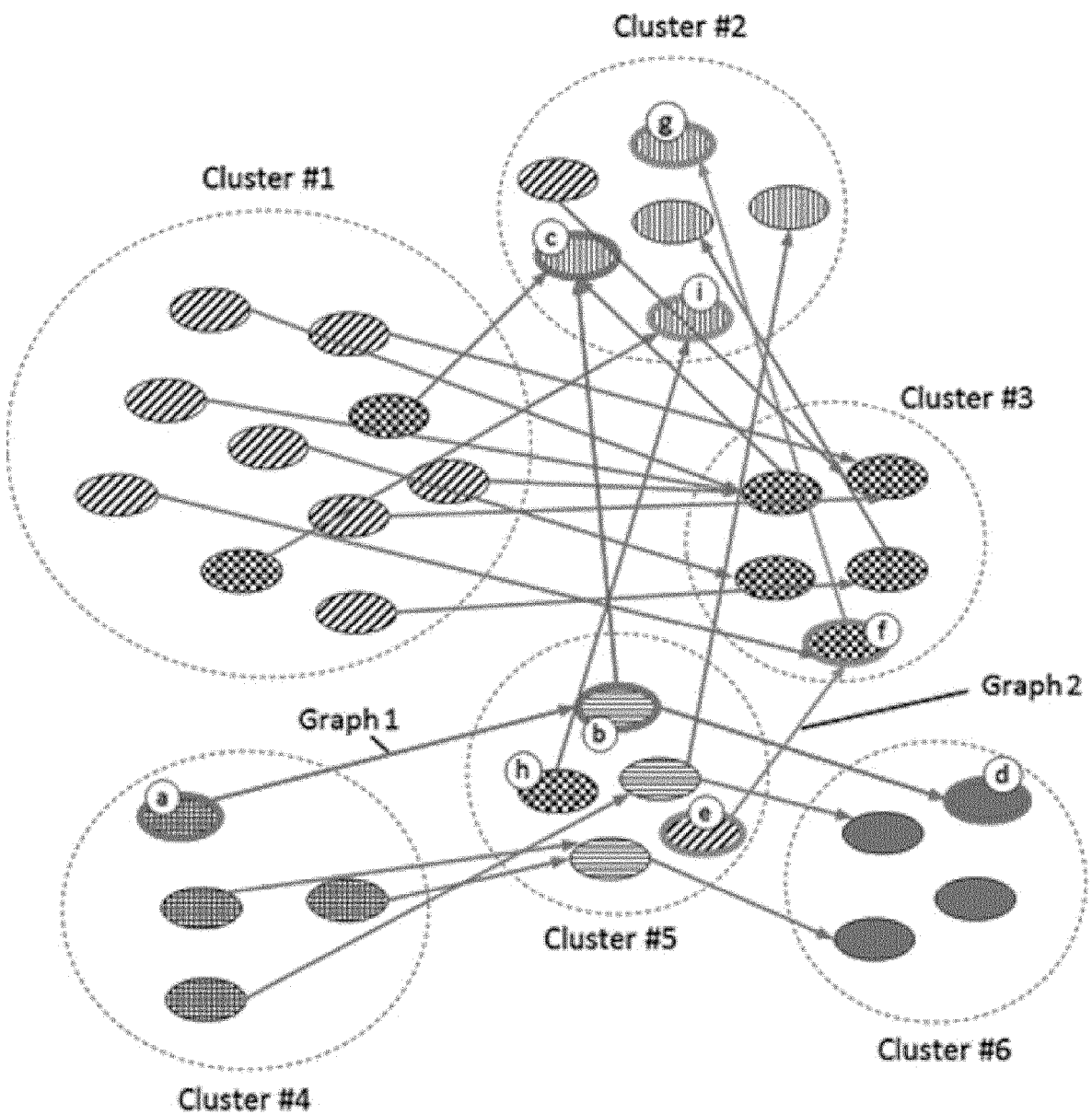
FIG. 19 illustrates exemplary attack graphs according to an exemplary embodiment of the present disclosure.

FIG. 19 illustrates an example where two directed graphs based on two attack patterns are constructed:

1. Graph 1 consisting of the nodes Event a, Event b, Event c and Event d.
2. Graph 2 consisting of the nodes Event e, Event f, and Event g.

Construct Attack Maps

Once the building of all directed graphs of detected events is completed, a next step is to examine those events that belong to the same cluster but do not share the same event name. Those events should also have been included as nodes in one of the directed graphs. In the example shown in FIG. 19 this applies to events in Cluster #2 and Cluster #5. The goal is to correlate such similar events to allow for merging or interconnecting some sections of different attack patterns (i.e. graphs) in order to construct attack maps that can show all possible attack paths. It will provide new knowledge on how particular attack may have been prepared and progressing within specific period of time.

Figure 20:
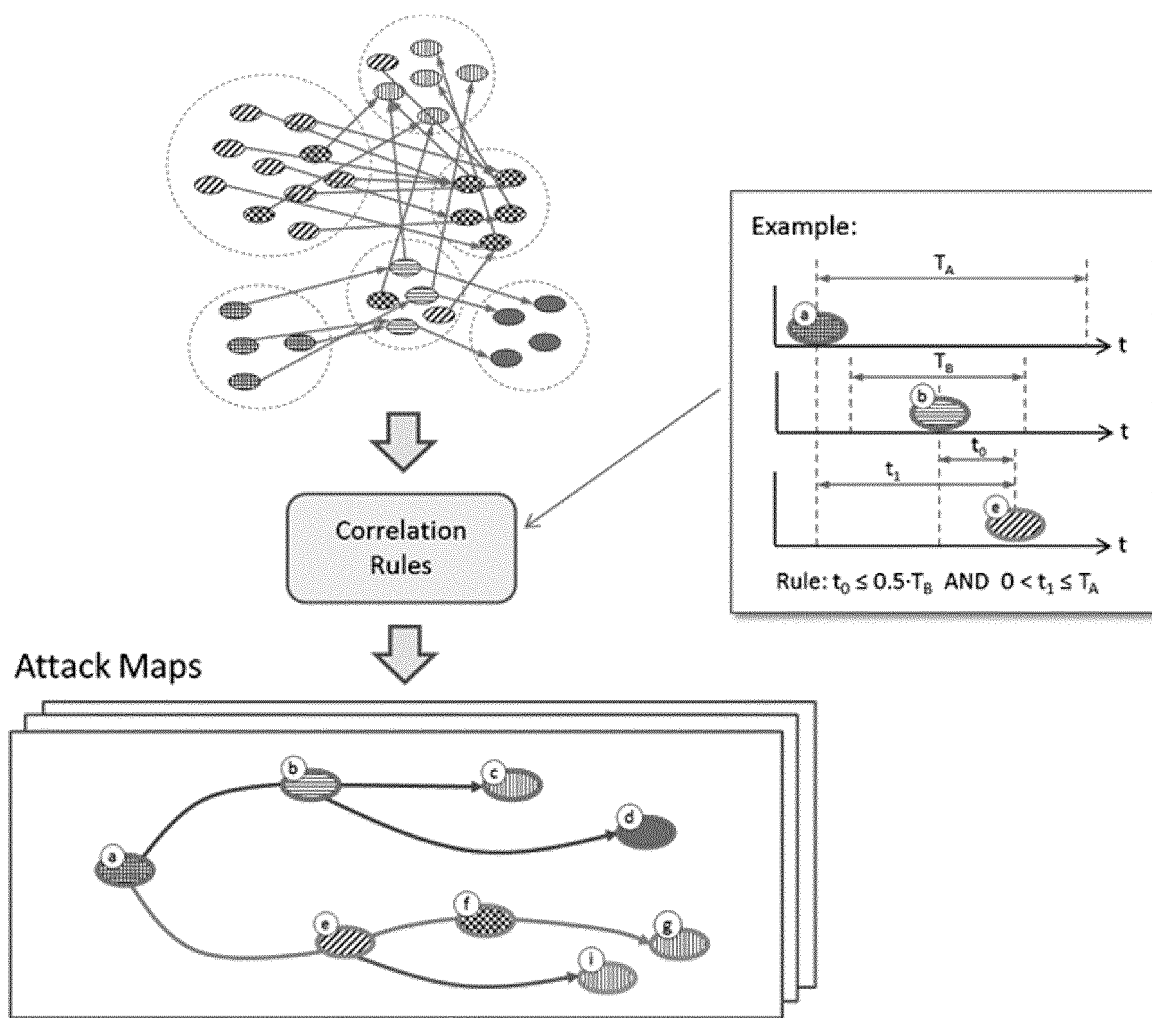
FIG. 20 illustrates an example correlation rule according to an exemplary embodiment of the present disclosure.

A set of (user-defined) correlation rules need to be applied to the events in the affected clusters in order to determine the ones that can be included in a shared attack map. The rules may also involve any preceding events identified in the directed graphs. FIG. 20 illustrates an example correlation rule which specifies the time windows and conditions under which two events can be connected. It further shows that Event b and Event e are grouped in the same Cluster #5 but they have different names and belong to different graphs (attack patterns). Both events were detected within the (moving) time window TB, and being part of Graph 1 Event b was preceded by Event a. If the rule condition between Event a and Event e is satisfied too, e.g. they are separated from each other not longer than TA and Event e was detected after Event a, the system can connect Event a to Event e and join the two graphs (i.e. Graph 1 and Graph 2) in a shared attack map. This means that Event e was likely to be a follow-up of Event a since it shares high similarity with Event b. Furthermore, Event h also shares similarity with Event e and Event i was identified as successive event for Event h. If the rule condition between Event e and Event i is satisfied, Event i can be included in the attack map as a potential successive event for Event e. The resulting attack map is depicted in FIG. 20. The same method can be applied to other events belonging to different attack patterns (i.e. graphs) to construct a variety of attack maps. As more new events are detected the constructed attack maps may also change over time.

Figure 21:
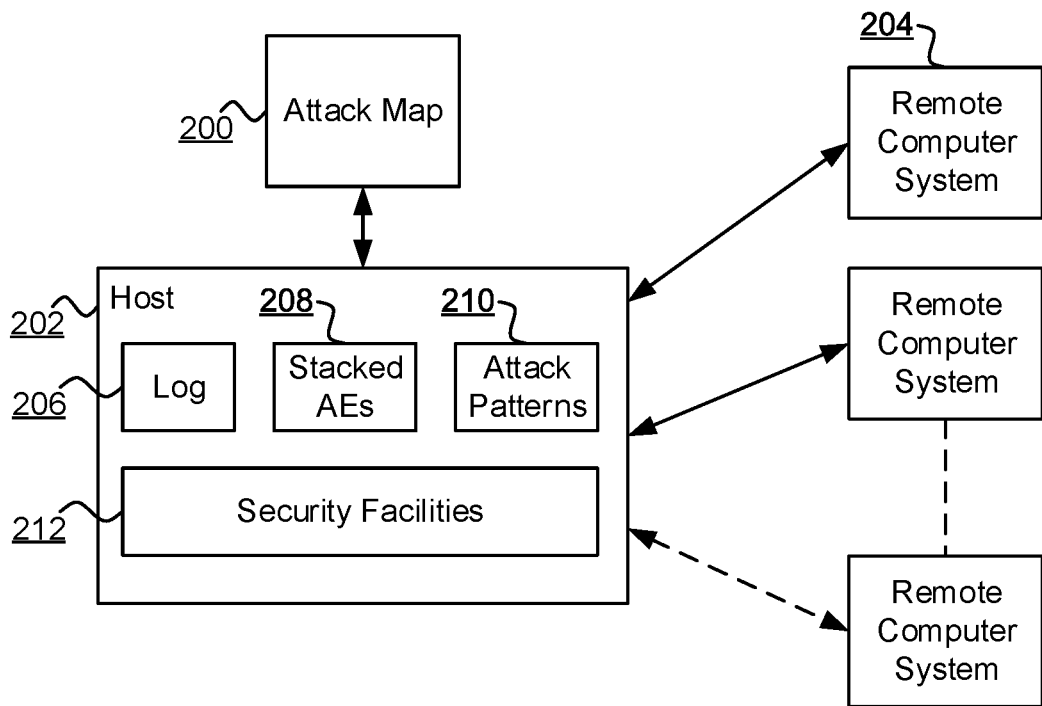
FIG. 21 is a component diagram of an arrangement for providing computer security according to embodiments of the present disclosure.

FIG. 21 is a component diagram of an arrangement for providing computer security according to embodiments of the present invention. A host computer system 202 is provided such as a physical or virtual computing device that is the subject of computer security facilities using embodiments of the present disclosure. Thus, the host 202 is in communication with a plurality of remote computer systems 204 such as via a physical, virtual, wired and/or wireless computer network. The host 202 includes security facilities 212 such as will be apparent to those skilled in the art including, inter alia and for example one or more of: a malware detection component; a virus detection component; an antivirus component; a firewall; an intrusion detection service; a bot-detection service; and other security facilities as will be apparent to those skilled in the art. The security facilities 212 are operable to generate security events as one or more data items having associated and/or including logs of network packets communicated as part of a security occurrence such as an attack, a threat, an intrusion or the like.

The host 202 is further provided with a set of predefined attack patterns 210, stacked autoencoders 208 and event log 206 each as previously described. The host 202 is thus operable to generate an attack map 200 while the host 202 is operating in a training mode of operation (as opposed to an operation mode of operation). The attack map 200 is a directed graph data structure including nodes and edges. Each node represents a security event occurring in respect of the host 202 that can constitute a part of an attack on the host 202. Each directed edge corresponds to a temporal relationship between security events so as to define paths through the attack map directed graph leading to an exploitation of the host 202. The attack map 202 is generated as previously described such that, during a training mode of operation of the host, a log 206 of each of multiple attack events occurring at the host is collected. The attack events include network packets involved in each attack event. The stacked autoencoders 208 are used to extract features from the log event in each attack. Subsequently, the directed graph representation of the attack map is generated based on each of the extracted features and based on a temporal relationship between events for each extracted feature and the attack patterns 210. The attack patterns define events and temporal relationships between events as previously described. In one embodiment, extracted features for each attack are combined with static features of each attack as previously described. In one embodiment, before generating the directed graph, all extracted features are clustered using a clustering algorithm to generate clusters of related extracted features, as previously described.

According to one embodiment of the present disclosure, the attack map 200 is used in an operational phase of the host 202 (as opposed to the training phase) to detect security events occurring in a sequence constituting a path through the attack map. In this way, the host 202 identifies a sequence of events indicative of an attack based on the attack map 200. Responsive to such a detection, one or more security facilities 212 can be deployed as protective measures. Additionally, or alternatively, existing security features 212 can be reconfigured, redoubled or otherwise adapted in response to the detection.

In one embodiment of the present disclosure, the host 202 is responsive to an occurrence of a new attack in the host computer system. The new attack does not result in the generation of attack events constituting a path through the attack map 200 to a known exploitation, and thus is not detected based on the attack map 200. Based on the occurrence of such a new attack, the host 202 adds the security events arising due to the new attack as new training data and triggers a regeneration of the attack map 200 so as to provide for the inclusion of the new attack in the attack map.

In one embodiment of the present disclosure the attack map 200 is used to improve security for the host 202 before operational exploitation is experienced. In particular, a subset of nodes in the attack map are determined such that the subset corresponds to events in attacks where each of the predetermined attack patterns involves at least one of the nodes in the subset are determined. Thus, a subset of nodes that covers substantially all attacks is selected. In some embodiments, a minimized subset (being a smallest number of nodes) that cover all attacks is selected. Subsequently, a component of the host 202 involved in each event represented by each of the nodes in the subset is determined. For example, a web server involved in a cross-site scripting attack; a database involved in an SQL injection attack, and so on. Subsequently, security facilities are deployed at each of the determined host components so as to mitigate attacks according to each of the attack patterns.

Figure 22:
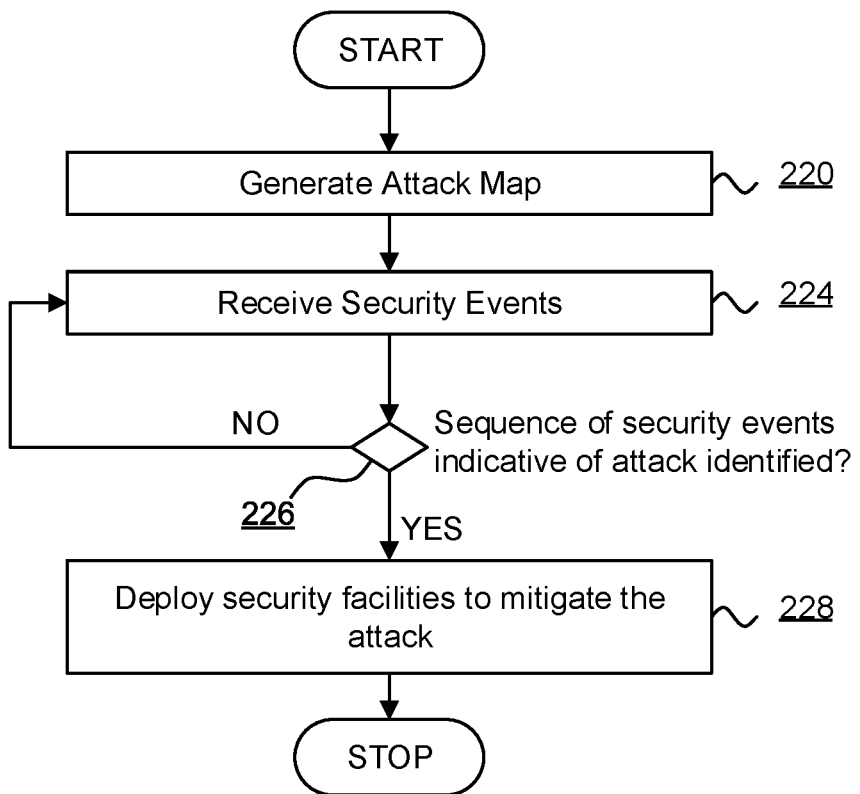
FIG. 22 is a flowchart of a method of computer security for a host computer system according to an embodiment of the present disclosure.

FIG. 22 is a flowchart of a method of computer security for a host computer system according to an embodiment of the present disclosure. Initially, at 220, the attack map 200 is generated as previously described. From 224 security events are received by the method. At 226 the method determines if a sequence of security events indicative of an attack according to the attack map 200 is identified. If a sequence of events indicative of an attack is identified, the method deploys security facilities 212 at 228 to mitigate the attack.

Figure 23:
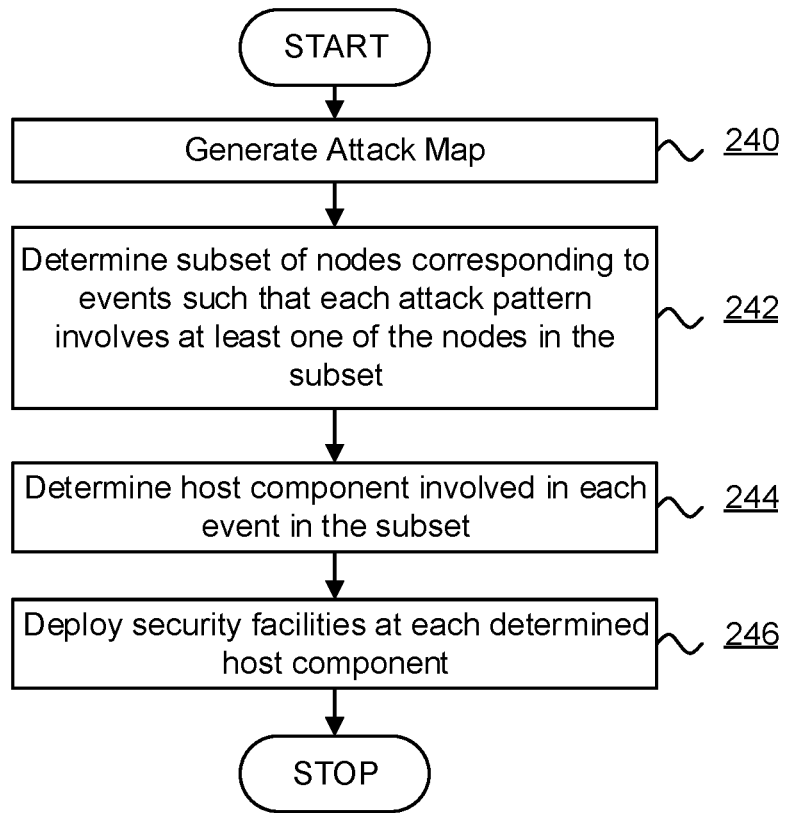
FIG. 23 is a flowchart of a method of computer security for a host computer system according to an embodiment of the present disclosure.

FIG. 23 is a flowchart of a method of computer security for a host computer system according to an embodiment of the present disclosure. At 240, the attack map 200 is generated as previously described. At 242 the method determines a subset of nodes in the attack map 200 such that the subset corresponds to events in attacks where each of the predetermined attack patterns involves at least one of the nodes in the subset are determined. At 244 host components involved in each event of the subset are determined. At 246 security facilities are deployed for each determined host component to mitigate future attacks.

Figure 24:
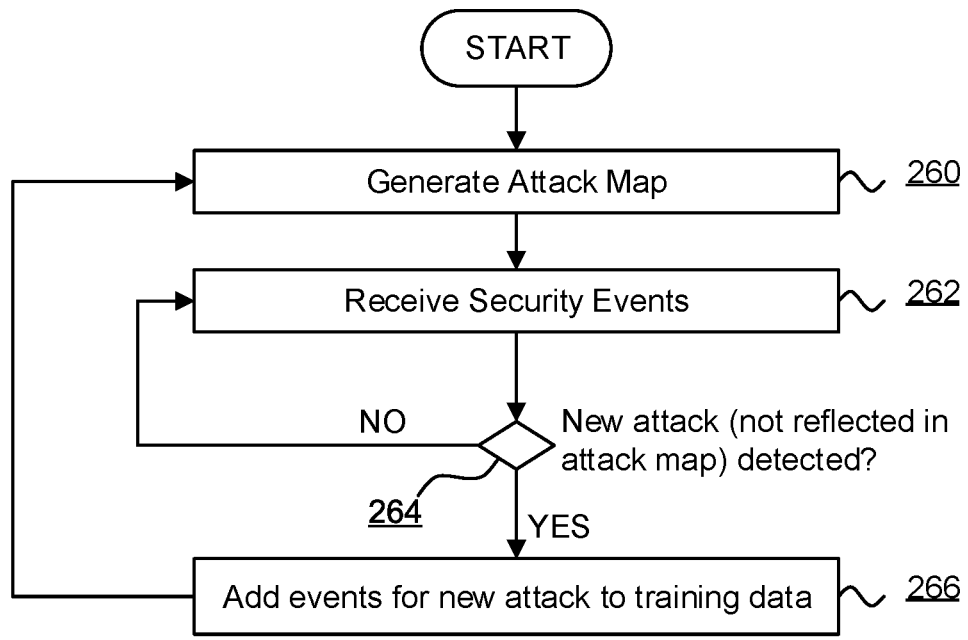
FIG. 24 is a flowchart of a method of computer security for a host computer system according to an embodiment of the present disclosure.

FIG. 24 is a flowchart of a method of computer security for a host computer system according to an embodiment of the present disclosure. At 260, the attack map 200 is generated as previously described. From 262 security events are received by the method. At 264 the method determines if a new attack has occurred being an attack not reflected in the attack map 200. Where a new attack has occurred, events generated as a result of the new attack are added to a set of training data and the method triggers the regeneration of the attack map 200 by returning to 260.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the disclosure is not limited thereto and that there are many possible variations and modifications which fall within the scope of the claims.

The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method of computer security for a host computer system in communication with remote computer systems, the method comprising:
generating an attack map as a directed graph data structure modelling individual events leading to an exploitation of the host computer system, the attack map being generated in a training phase of the host computer system in which the host computer system is subjected to attacks by one or more attacking remote computer systems, and generating the attack map includes:
collecting a log of each of a plurality of attack events occurring at the host computer system including network packets involved in each attack event,
using stacked autoencoders to extract features from the log in each attack event, and
generating a directed graph representation based on each of the extracted features based on a temporal relationship between attack events for each extracted feature and a predefined definition of each of a plurality of attack patterns defining attack events and temporal relationships between attack events; and
responsive to an occurrence of a new attack in the host computer system, the attack not resulting in the generation of attack events constituting a path through the attack map to a known exploitation, triggering regeneration of the attack map by the collecting, the using, and the generating including additional events generated in respect of the new attack.

2. The method of claim 1, wherein the extracted features for each attack are combined with static features of each attack.

3. The method of claim 1, wherein, before generating the directed graph data structure, all extracted features are clustered using a clustering algorithm to generate clusters of related extracted features.

4. A computer system comprising:
a processor and memory storing computer program code for performing the method of claim 1.

5. A non-transitory computer-readable storage medium storing a computer program element comprising computer program code to, when loaded into a computer system and executed thereon, cause the computer system to perform the method as claimed in claim 1.

* * * * *